United States Patent Office 3,422,600
Patented Jan. 21, 1969

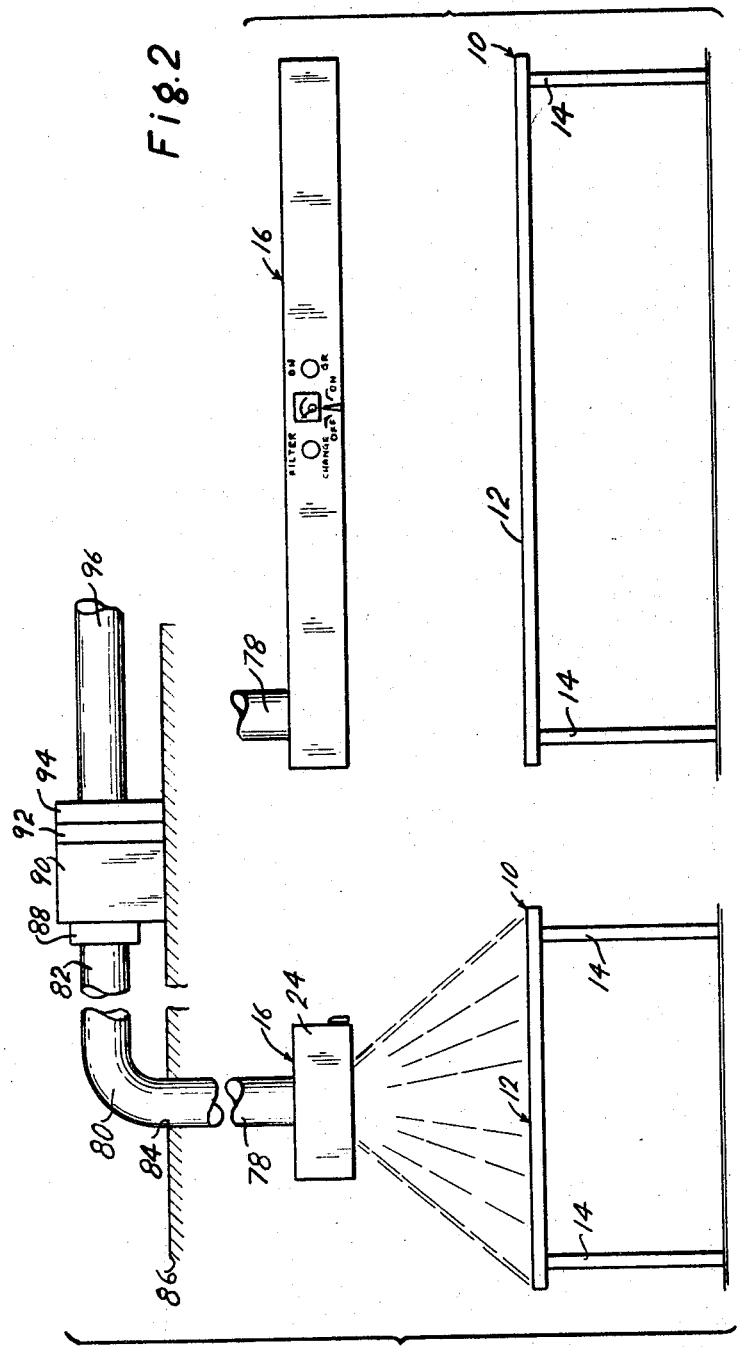

3,422,600
AIR-CONDITIONED MEAT CUTTING TABLE
Charles A. Chamberlain, Tacoma, Wash.
(Box 337, Milton, Wash. 98354)
Filed Oct. 22, 1965, Ser. No. 501,890
U.S. Cl. 55—126          8 Claims
Int. Cl. B03c 3/14

This invention is for a meat cutting table which maintains the meat at a below freezing temperature and allows the workers, cutting and wrapping the meat, to be at a temperature above freezing temperature.

One of the prior conventional ways of cutting and wrapping meat was to maintain the room at approximately 20° F. At this temperature, the meat is cold and below the freezing temperature. As a result, the meat has a better bloom and bleeds less while it is being cut. Further, it is easier to cut meat at this temperature than at the elevated temperature of above freezing temperature. A further advantage is that the meat has a better shelf life and can be packaged so as to be better displayed than when it is cut at a higher temperature. Although there are the above advantages of cutting meat at approximately 20° F., the prior conventional method had obvious disadvantages such as, the workers had to work at the low temperature. Many of the workers objected. Some of the workers became unnecessarily ill and sick. From having worked with meat cutters and packers, I have acquired knowledge which led to the invention of this air-conditioned meat cutting table which makes it possible to maintain the meat at a temperature of approximately 20° F., but allows the worker to be at a temperature of approximately 70° F. Accordingly, it is an object of this invention to provide a meat cutting table which maintains the meat at a temperature of about 20° F. without substantially cooling the worker; which provides less basis for an objection by the worker as to the cold working conditions; which results in less illness and sickness by the workers keeping cold working conditions; which requires less cold air to cool the meat than prior conventional methods as only a wedge of cold air is being cooled and not an entire room; which makes it possible to secure a greater output per worker; which allows unrestricted entrance to the meat cutting areas; and which is relatively inexpensive to install.

These and other important objects and advantages of the invention will be more particularly brought forth on reference to the accompanying drawings, the detailed specification of the invention and the appended claims.

In the drawings:

FIGURE 1 is an end elevational view of a schematic diagram of the meat cutting table and the means for dispensing cold air over the meat on the working surface;

FIGURE 2 is a fragmentary side elevational view of the meat cutting table and the means for dispensing cold air over the working surface of the meat cutting table;

Figure 3:
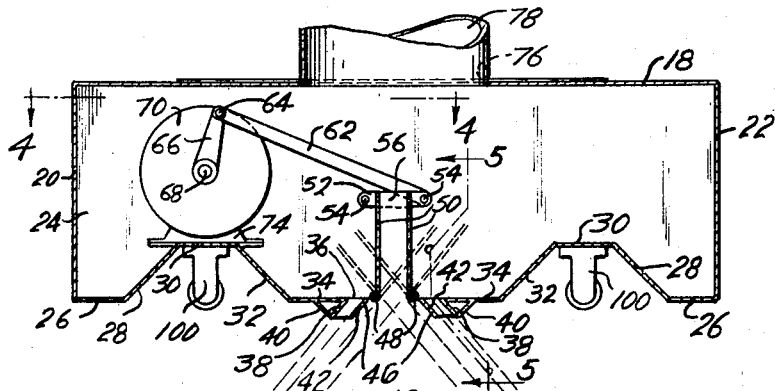
FIGURE 3 is a fragmentary lateral cross-sectional view of the plenum for directing cold air over the working surface of the meat cutting table and shows details of the operating mechanism.
Figure 4:
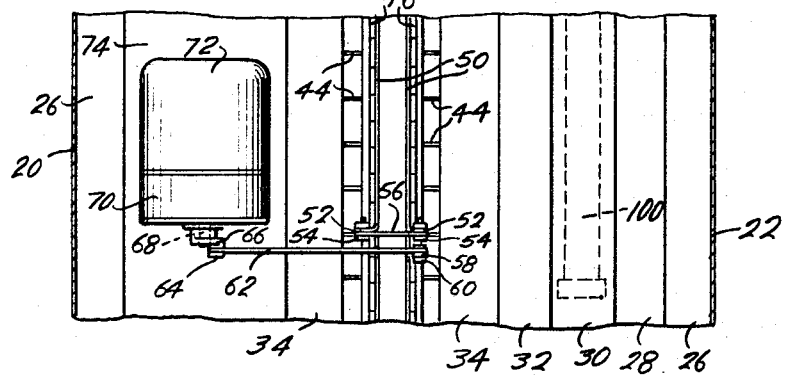
Figure 5:
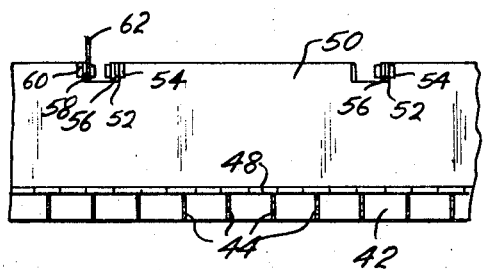

FIGURE 4, taken on line 4—4 of FIGURE 3, is a cross-sectional plan view illustrating the components for directing the cold air over the working surface of the meat cutting table;

FIGURE 5, taken on line 5—5 of FIGURE 3, is a lateral cross-sectional view illustrating the means for forming an air curtain for the main stream of cold air over the working surface of the meat cutting table.

In FIGURES 1 and 2 it is seen that there is a table 10 having a working surface 12 and legs 14.

There is positioned above the table 10 a plenum 16 which comprises means for directing cold air onto the working surface 12 of the table 10. This plenum 16 comprises the housing having an upper surface 18, a left side 20 and a right side 22. There are ends 24 for the plenum 16. The left side 20 and the right side 22 on their lower extremities bend inwardly to form first bottom member 26. The first bottom member 26 then bends upwardly and inwardly to form the first inwardly sloping member 28. The first inwardly sloping member 28 then bends inwardly to form the first support 30. The first support 30 bends downwardly and inwardly to form the second inwardly sloping member 32. Then the second inwardly sloping member 32 bends inwardly to form the second bottom member 34. It is seen that the two bottom members 34 do not touch each other, but define an opening 36. Also, the second bottom member 34 folds back and underneath itself at 38. Then, 38 folds back and upwardly at 40 to contact the lower surface of the bottom member 34. 40 may be welded to 34. It is seen that 38 and 40 act as a reinforcing rib for the outer extremity of the second bottom member 34. It is seen that spaced apart and parallel to the member 38 is a member 42. The member 42 is attached to the bottom member 34 and the member 38 by means of vanes and supports 44. Also, it is seen that the members 40 and 38 act as guides for air passing between these two spaced-apart members. Further, it is seen that the two members 38 define an opening 46. Actually, there may be considered to be three openings in the lower part of the plenum 16. There is a first large opening 46 between the members 42. Then, there is a second opening between a member 42 and a juxtapositioned member 38, and there is a third opening between another member 42 and another juxtapositioned member 38.

In the drawings it is seen that the plenum 16 is much longer than it is wide. However, the plenum 16 may be as wide as it is long. However, with this configuration, the smaller working surface would be cooled faster than with the configuration of a long and relatively narrow plenum.

Attached to the inner edge of each bottom member 34 is a hinge 48. Attached to each hinge 48 is a deflector plate 50. It is seen that there are two deflector plates 50, and these two deflector plates act as spaced-apart guides for the air passing between them. Attached to the upper and free end of each deflector plate 50 is a lug 52. There is an opening in each of the lugs 52, and the bolt 54 passes through each of these openings so as to connect a tie link 56 to each of the lugs 52. There may be only one tie link 56, but I consider that greater stability is achieved if there be two or more tie links 56. On one of the deflector plates 50 there is a lug 52. In FIGURE 5 it is seen that the upper part of the deflector plate is cut away and bent so as to be directed to a side 20 or a side 22 to form the lug 52. There is a passageway in each of the lugs 52 and a bolt 54 connects a tie link 56 to two aligned lugs 52. It is to be realized that the tie link 56 and the lug 52 are free to move with each other so that the deflector plates 50 may rotate around a hinge 48 and, also, may rotate around a bolt 54. I prefer to have a multiplicity of tie links 56 to give added stability to the deflector plates 50. In FIGURE 4 it is seen that the upper part on one of the deflector plates 50 is bent back on itself to form a lug 58. A bolt 60 passes through an opening in the lug 58 to attach a driving link 62 to the lug 58. Again, the driving link 62 is free to rotate around the bolt 60 so that the driving links 62 and the deflector plate 50 move with respect to each other. The other end of the driving link 62 is connected by means of a bolt 64 to a crank arm 66. The inner end of the crank arm 66 connects with the output shaft 68 of a gear head 70. The gear head 70 is attached to the output shaft of a motor 72. The motor 72 and the gear head 70 are commonly known as a gear-head motor. The motor 72 is mounted on a base 74 which rests on one of the first supports 30. It is seen that, as the output shaft 68 rotates, the crank arm 66 rotates to move the driving link 62 which rotates the two spaced-apart guides or deflector plates 50.

In the uper surface 18 of the plenum 16, there is an opening 76. Positioned in the opening 76 is a pipe or tube 78. It is seen in FIGURE 1 that the pipe or tube 78 bends at 80 to form a straight section 82. Also, it is seen that the pipe or tube 78 passes through an opening 84 in a ceiling 86. Actually, in certain installations, it may not be necessary to have a ceiling 86.

The pipe 78, 80 and 82 may be referred to as the discharge duct. The discharge duct connects with an ultraviolet bacteria killing section 88, a cooling and blower section 90, an electrostatic filter 92 and a mechanical filter 94. The mechanical filter 94 connects with an air supply duct 96. Actually, the air supply duct 96 is just an intake and may connect with the room or may connect with the outside of the room and outside of the building to a source of air.

It is readily seen that the mechanical filter filters out a major portion of the impurities such as dust from the air. The mechanical filter may be wire screens or cloths or fiberglass mat. The electrostatic filter is commercially available and removes the extremely small particles of impurities from the air. The electrostatic filter normally comprises two or more plates with a high voltage between the plates to precipitate out the small particles. The cooler and blower section 90 comprises an air-conditioning unit for cooling the air to a temperature of about 20° F. and the blower section comprises means for forcing the air through the ultraviolet bacterial section 88. The section 88 comprises a source of ultraviolet rays for killing bacteria in the air and, thereby, purifying the air. The clean purified, filtered, cooled air from section 88 flows into the discharge duct, through pipe or tube 78 and into the plenum 16. It is seen that there are only three places in which the air can escape from the plenum 16, viz., the first opening between the two spaced-apart guides or deflector plates 50, and the second and third openings 36 between 38 and 40. The two openings 36 act as guides to form an air curtain on each side of the air escaping from the plenum 16. The air passing through the first opening, defined by the deflector plates 50 and the inner edges of the members 46, is directed by the movement of the deflector plates 50. These two deflector plates 50 are substantially parallel to each other at all times; and, by the rotation of the output shaft 68 and the linkage 66 and 62, the deflector plates 50 are rotated through an arc. These deflector plates 50 direct the escaping cold air between the two air curtains and over the working surface 12. In this manner it is not necessary to flood the working surface 12 with cold air all of the time; but, only to move a stream of cold air back-and-forth across the working surface and between the insulating air curtain.

From the foregoing it is seen that I have provided an air-conditioned meat cutting table which maintains the meat on the working surface of the table at a temperature of approximately 20° F. At this temperature, meat is frozen and is easier to cut; and, the resulting package of meat looks better than if the meat were cut at a temperature of about 40° F. Also, there is substantially no bleeding of the meat at this temperature, and the meat gives a better bloom along with a longer shelf life. Of benefit to the worker is the fact that the room may be at a temperature of 40 to 45° F., a temperature which is more desirable for working than is a temperature of 20° F. Also, less air is required to cool a relatively small working surface to 20° F. than is required to cool an entire room to 20° F. Further, there may be unrestricted entering and leaving of a room when only the working surface is cooled instead of the entire room being cooled.

On the bottom surface of the first support 30 there may be positioned light fixtures 100.

The positioning of the light fixtures 100 assist in lighting the working surface 12. The sloping members 28 and 32, along with the support 30, act as reflectors for the light rays. Further, these light fixtures 100 are positioned in the plenum 16 so as to be protected by the plenum itself.

Having presented by invention, what I claim is:

1. An air-conditioned meat cutting table, said meat cutting table comprising:
    (a) a working surface on which meat is placed;
    (b) a plenum positioned above said working surface;
    (c) said plenum comprising a housing having a bottom;
    (d) a first opening in the bottom;
    (e) means for directing air with respect to and through said opening;
    (f) a second opening in the bottom on one side of the first opening and a third opening in the bottom on the other side of said first opening;
    (g) means for directing air with respect to said second and third openings downwardly and outwardly;
    (h) a source of air under pressure;
    (i) means connecting said source of air under pressure with the plenum;
    (j) means for filtering the air;
    (k) means to cool the air;
    (l) said means for filtering the air and said means to cool the air being connected upstream of the plenum housing and being connected to said source of air under pressure; and,
    (m) means discharging air through the second and third openings to form an air curtain on each side of the air discharged through the first opening while said air discharged through the first opening is moving across the working surface.

2. An air-conditioned meat cutting table, said meat cutting table comprising:
    (a) a working surface on which meat is placed;
    (b) a plenum positioned above said working surface;
    (c) said plenum comprising a housing having a bottom;
    (d) a first opening in the bottom;
    (e) means for directing air with respect to and through said opening;
    (f) a second opening in the bottom on one side of the first opening and a third opening in the bottom on the other side of said first opening;
    (g) means for directing air with respect to said second and third openings downwardly and outwardly;
    (h) a source of air under pressure;
    (i) means connecting said source of air under pressure with the plenum;
    (j) means for filtering the air;
    (k) said means for filtering the air being connected upstream of the plenum housing and being connected to said source of air under pressure; and,
    (l) means discharging air through the second and third openings to form an air curtain on each side of the air discharged through the first opening while said air discharged through the first opening is moving across the working surface.

3. An air-conditioned meat cutting table, said meat cutting table comprising:
    (a) a working surface on which meat is placed;
    (b) a plenum positioned above said working surface;
    (c) said plenum comprising a housing;
    (d) two spaced-apart openings in said housing about a first opening defining a main airstream;
    (e) means for directing air with respect to the two openings downwardly and outwardly to define an air curtain about said main airstream from said first opening;
    (f) a source of air under pressure connected upstream to said plenum housing; and,
    (g) means for cooling the air connected upstream of the housing and to the source of air under pressure.

4. An air-conditioned meat cutting table, said meat cutting table comprising:
  (a) a working surface on which meat is placed;
  (b) a plenum positioned above said working surface;
  (c) said plenum comprising a housing having a bottom;
  (d) a first opening in the bottom;
  (e) two spaced-apart guides positioned inside of said housing and juxtapositioned to said opening;
  (f) a hinge connecting one of said spaced-apart guides to the bottom on each side of the opening;
  (g) a tie link connecting the upper part of said two spaced-apart guides;
  (h) a driving link connecting with one of said spaced-apart guides;
  (i) a Scotch yoke plate connecting with said driving link;
  (j) a motor connecting with said Scotch yoke plate to move said spaced-apart guides;
  (k) a second opening in the bottom on one side of the first opening and a third opening in the bottom on the other side of said first opening;
  (l) a guide means on each side of the second and third openings to direct air downwardly and outwardly;
  (m) a source of air under pressure;
  (n) means connecting said source of air under pressure with the plenum;
  (o) a mechanical filter for filtering the air;
  (p) an electrostatic filter for filtering the air;
  (q) an air-conditioning unit for cooling the air;
  (r) a source of ultraviolet rays for purifying the air;
  (s) said filters for filtering the air and said unit for cooling the air and said source of ultraviolet rays for purifying the air being connected upstream of the plenum housing and being connected to said source of air under pressure; and,
  (t) means discharging air through the second and third openings to form an air curtain on each side of the air discharged through the first opening while said air discharged through the first opening is moving across the working surface.

5. An air-conditioned meat cutting table, said meat cutting table comprising:
  (a) a working surface on which meat is placed;
  (b) a plenum positioned above said working surface;
  (c) said plenum comprising a housing having a bottom;
  (d) a first opening in the bottom;
  (e) two spaced-apart guides positioned inside of said housing and juxtapositioned to said opening;
  (f) a hinge connecting one of said spaced-apart guides to the bottom on each side of the opening;
  (g) a tie link connecting the upper part of said two spaced-apart guides;
  (h) means connecting with the spaced-apart guides to move said spaced-apart guides;
  (i) a second opening in the bottom on one side of the first opening and a third opening in the bottom on the other side of said first opening;
  (j) a guide means on each side of the second and third openings to direct air downwardly and outwardly;
  (k) a source of air under pressure;
  (l) means connecting said source of air under pressure with the plenum;
  (m) a mechanical filter for filtering the air;
  (n) an electrostatic filter for filtering the air;
  (o) an air-conditioning unit for cooling the air;
  (p) a source of ultraviolet rays for purifying the air;
  (q) said means for filtering the air and said unit for cooling the air and said source of ultraviolet rays being connected upstream of the plenum housing and being connected to said source of air under pressure; and,
  (r) means discharging air through the second and third openings to form an air curtain on each side of the air discharged through the first opening while said air discharged through the first opening is moving across the working surface.

6. An air-conditioned meat cutting table, said meat cutting table comprising:
  (a) a working surface on which meat is placed;
  (b) a plenum positioned above said working surface;
  (c) said plenum comprising a housing having a bottom;
  (d) a first opening in the bottom;
  (e) two spaced-apart guides positioned inside of said housing and juxtopositioned to said opening;
  (f) a hinge connecting one of said members to the bottom on each side of the opening;
  (g) a tie link connecting the upper part of said two spaced-apart guides;
  (h) means connecting with the spaced-apart guides to move said spaced-apart guides;
  (i) a second opening in the bottom on one side of the first opening and a third opening in the bottom on the other side of said first opening;
  (j) means for directing air with respect to said second and third openings downwardly and outwardly;
  (k) a source of air under pressure;
  (l) means connecting said source of air under pressure with the plenum;
  (m) means for cooling the air and said means connecting upstream of the plenum housing with the source of air under pressure; and,
  (n) means discharging air through the second and third opennigs to form an air curtain on each side of the air discharged through the first opening while said air discharged through the first opening is moving across the working surface.

7. An air-conditioned meat cutting table, said meat cutting table comprising:
  (a) a working surface on which meat is placed;
  (b) a plenum positioned above said working surface;
  (c) said plenum comprising a housing having a bottom;
  (d) an opening in the bottom;
  (e) two spaced-apart guides positioned inside of said housing and juxtapositioned to said opening;
  (f) a hinge connecting one of said spaced-apart guides to the bottom on each side of the opening;
  (g) a tie link connecting the upper part of said two spaced-apart guides;
  (h) a driving link connecting with one of said spaced-apart guides;
  (i) a Scotch yoke plate connecting with said driving link;
  (j) a motor connecting with said Scotch yoke plate to move said spaced-apart guides;
  (k) a source of air under pressure;
  (l) means connecting said source of air under pressure with the plenum;
  (m) a mechanical filter for filtering the air;
  (n) an electrostatic filter for filtering the air;
  (o) an air-condiitoning unit for cooling the air;
  (p) a source of ultraviolet rays for purifying the air; and,
  (q) said means for filtering the air and said unit for cooling the air and said source of ultraviolet rays being connected upstream of the plenum housing and being connected to said source of air under pressure.

8. An air-conditioned meat cutting table, said meat cutting table comprising:
  (a) a working surface on which meat is placed;
  (b) a plenum positioned above said working surface;
  (c) said plenum comprising a housing having a bottom;
  (d) an opening in the bottom;
  (e) two spaced-apart guides positioned inside of said housing and juxtapositioned to said opening;

(f) a hinge connecting one of said spaced-apart guides to the bottom on each side of the opening;
(g) a tie link connecting the upper part of said two spaced-apart guides;
(h) means connecting with the spaced-apartt guides to move said spaced-apart guides;
(i) a source of air under pressure; and
(j) means for cooling the air and said cooling means being connected upstream of the plenum housing and to the source of air under pressure.

References Cited

UNITED STATES PATENTS

| | | | |
|---|---|---|---|
| 2,709,954 | 7/1955 | Baker | 55—279 |
| 2,964,412 | 12/1960 | Morrison | 99—194 |
| 3,055,760 | 9/1962 | Morrison | 99—194 |
| 3,068,775 | 12/1962 | Zehnder. | |
| 3,094,400 | 7/1963 | Blanton | 55—279 |
| 3,107,863 | 10/1963 | Potapenko | 55—279 |
| 3,229,611 | 1/1966 | Berger. | |
| 3,251,177 | 5/1966 | Baker | 55—521 |
| 3,277,638 | 10/1966 | Soltis | 55—473 |
| 3,318,076 | 5/1967 | Baker | 55—350 |

HARRY B. THORNTON, *Primary Examiner.*

B. NOZICK, *Assistant Examiner.*

U.S. Cl X.R.

55—385, 415, 279, 267, 467, 135, 145, 482; 98—36, 40; 21—74; 62—261